US012679395B2

(12) United States Patent
Hashimoto

(10) Patent No.: US 12,679,395 B2
(45) Date of Patent: Jul. 14, 2026

(54) CONTROL DEVICE AND METHOD FOR CALIBRATING AN AUTOMATED DRIVING SYSTEM

(71) Applicant: TOYOTA MOTOR EUROPE, Brussels (BE)

(72) Inventor: Ryuta Hashimoto, Brussels (BE)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 406 days.

(21) Appl. No.: 18/249,994

(22) PCT Filed: Oct. 27, 2020

(86) PCT No.: PCT/EP2020/080209
§ 371 (c)(1),
(2) Date: Apr. 21, 2023

(87) PCT Pub. No.: WO2022/089734
PCT Pub. Date: May 5, 2022

(65) Prior Publication Data
US 2023/0391351 A1     Dec. 7, 2023

(51) Int. Cl.
*B60W 50/04*          (2006.01)
*B60W 50/02*          (2012.01)
(Continued)

(52) U.S. Cl.
CPC ...... *B60W 50/045* (2013.01); *B60W 50/0205* (2013.01); *B60W 60/00186* (2020.02);
(Continued)

(58) Field of Classification Search
CPC . B60W 2050/0062; B60W 2050/0075; B60W 2050/0082; B60W 2050/0083;
(Continued)

(56) References Cited

U.S. PATENT DOCUMENTS 9,201,424 B1    12/2015  Ogale
10,507,841 B1    12/2019  Singh et al.
(Continued)

FOREIGN PATENT DOCUMENTS

KR      101 989 370 B1    6/2019
WO      2020/016092 A1    1/2020

OTHER PUBLICATIONS

Xu et al., Online Intelligent Calibration of Cameras and LiDARs for Autonomous Driving Systems, 2019, IEEE (Year: 2019).*

*Primary Examiner* — Ramya P Burgess
*Assistant Examiner* — Sara J Lewandroski
(74) *Attorney, Agent, or Firm* — Dickinson Wright, PLLC

(57)          ABSTRACT

The invention relates to control device (1) for calibrating an automated driving system (10) of a vehicle (30) during driving, configured to:
    receive sensor information of at least one sensor (3) of the automated driving system, the sensor being configured to sense the environment of the vehicle,
    determine based on the received sensor information, whether calibration of the automated driving system and/or the sensor is necessary,
    determine the processing load of a processor unit (2) of the automated driving system, the processor unit controlling automated driving of the vehicle,
    calibrate the automated driving system and/or the sensor only, in case the determined processing load is below a predetermined load threshold.
The invention further relates to an automated driving system, a vehicle and a method of calibrating an automated driving system of a vehicle.

16 Claims, 1 Drawing Sheet

(51) Int. Cl.
| | |
|---|---|
| B60W 60/00 | (2020.01) |
| G06V 20/56 | (2022.01) |
| B60W 50/00 | (2006.01) |

(52) U.S. Cl.
CPC ... G06V 20/588 (2022.01); B60W 2050/0083 (2013.01); B60W 2050/0215 (2013.01); B60W 2420/403 (2013.01); B60W 2552/53 (2020.02)

(58) Field of Classification Search
CPC . B60W 2050/0085; B60W 2050/0086; B60W 2050/0088; B60W 2050/021; B60W 2050/0215; B60W 2050/041; B60W 2050/043; B60W 2050/046; B60W 2050/065; B60W 50/0098; B60W 50/02; B60W 50/0205; B60W 50/0225; B60W 50/04; B60W 50/045; B60W 50/06; B60W 50/08; B60W 50/085; B60W 60/001; B60W 60/0015; B60W 60/0016; B60W 60/0018; B60W 60/00182; B60W 60/00186; B60W 2552/53; B60W 2420/403; G06V 20/50; G06V 20/56; G06V 20/588

See application file for complete search history.

(56) References Cited

U.S. PATENT DOCUMENTS

| | | | |
|---|---|---|---|
| 2019/0009790 A1 | 1/2019 | Michalakis et al. | |
| 2019/0052804 A1* | 2/2019 | Maruhashi | H04N 1/32128 |
| 2020/0077023 A1* | 3/2020 | Kang | G06N 3/09 |
| 2021/0272248 A1* | 9/2021 | Slutsky | G06N 3/045 |

* cited by examiner

CONTROL DEVICE AND METHOD FOR CALIBRATING AN AUTOMATED DRIVING SYSTEM

RELATED APPLICATION

This application is a 371 of International Application No. PCT/EP2020/080209, filed on Oct. 27, 2020, including the specification, drawings and abstract, the entire disclosure of which is incorporated herein by reference.

FIELD OF THE DISCLOSURE

The present disclosure is related in general to the field of self-driving vehicles, and more in particular to a control device and method for calibrating an automated driving system. The calibration technique may in particular be useful for automated driving systems, which require precise and reliable position information of the vehicle with regard to detected objects in its environment.

An automated driving system is a motor vehicle driving automation system that is capable of performing part or all of the dynamic driving task (DDT) on a sustained basis. An automated driving system may be mounted or is to be mounted in a vehicle (such as a car, a truck, an airplane).

In the case of road vehicles in particular, it may range in level from no driving automation (level 0) to full driving automation (level 5) according to SAE norm J3016.

In order to realize this function, an automated driving system normally comprises at least one sensor, an electronic processor unit, and feedback devices which transmit information to the driver and/or act on control member(s) of the vehicle (for instance the steering shaft, the brake, the accelerator pedal or the like) instead of the driver to take some driving load off the driver.

An automated driving system is at least capable of assuming part of the driving task (for instance, to perform longitudinal control of the vehicle). In particular, many automated driving systems are designed to assist the driver and are therefore called Advanced Driver Assistance Systems (ADAS). Some automated driving systems are capable of assuming the whole driving task, at least during some periods. Such systems are classified at level 3, 4 or 5 according to SAE norm J3016.

The present disclosure may concern an automated driving system classified desirably at level 3 or more according to SAE norm J3016.

BACKGROUND OF THE DISCLOSURE

Automated driving systems require position information of the vehicle, in order to navigate. This position information may include a "global position", i.e. a geo position information (e.g. a GPS signal), in order to localize the vehicle on a specific map position and to navigate the vehicle to a pre-selected destination. In other words, said global position information is external position information, i.e. which has been determined by using external position means (i.e. an external source), e.g. navigation satellites.

The position information may additionally or alternatively include a "micro position" or "relative position", i.e. position information of the vehicle with regard to its detected environment (i.e. surrounding area). For example, the vehicle may comprise an object detection sensor (e.g. one or several cameras), wherein external objects (e.g. the road/lane on which the vehicle is moving and/or other vehicles) are detected.

However, there may occur the problem that the automated driving system in general or any of its sensors in particular is not correctly calibrated and therefore not satisfactorily precise for a reliable automated navigation of the vehicle.

In particular, calibration can be misaligned while automated driving. In such situation, one option is to stop automated driving, such that the system can be (re)calibrated. However, stopping automated driving will decrease user comfort, so it is desirable to re-calibrate while automated driving.

For example, U.S. Pat. No. 9,201,424 (B1) relates to a system for camera calibration using structure from motion techniques. An autonomous vehicle may receive thereby images from a vehicle camera system and may determine an image-based pose based on the images. To determine an image-bases pose, an autonomous vehicle may perform various processes related to structure from motion, such as image matching and bundle adjustment. In addition, the vehicle may determine a sensor-based pose indicative of a position and orientation of the vehicle through using information provided by vehicle sensors. The vehicle may align the image-based pose with the sensor-based pose to determine any adjustments to the position or orientation that may calibrate the cameras. In an example, a computing device of the vehicle may align the different poses using transforms, rotations, and/or scaling.

However, as a drawback, automated calibration itself implies a processing load, i.e. consumes calculation power of the processing unit. Consequently, due to the limited capacity of the processing unit of the automated driving system there can be a conflict between calculation power required for calibration and calculation power required for automated driving control.

Furthermore, the calibration can depend on surrounding situation, i.e. on objects in the environment of the vehicle which may be used as references in the calibration process. In some situations calibration can therefore be easier than in others. So, to ensure a precise and accurate calibration, it is desirable to do calibration in suitable environmental situations.

The risk of a calibration error is in particular given for e.g. fisheye cameras, when they are used for automated driving control. Fisheye cameras are one of the key recognition sensors to allow an inexpensive automated driving control. Moreover, when a plurality of cameras is used to generate a common image, there is the risk that the individual camera images are misaligned and have to be re-calibrated.

SUMMARY OF THE DISCLOSURE

Currently, it remains desirable to provide a control device and method for (desirably automatically) calibrating an automated driving system of a vehicle during driving in a reliable and economical manner.

Therefore, according to the embodiments of the present disclosure, a control device for (e.g. automatically) calibrating an automated driving system of a vehicle during driving is provided. The control device is configured to:

receive sensor information of at least one sensor (3) of the automated driving system, the sensor being configured to sense the environment of the vehicle, determine based on the received sensor information, whether calibration of the automated driving system and/or the sensor is necessary, determine the processing load of a processor unit of the automated driving system, the processor unit controlling automated driving of the vehicle (desirably at the time of said determination), and calibrate the automated driving system and/or the sensor only, in case the determined processing load is below a predetermined load threshold.

By providing such a control device, it becomes possible to ascertain that the automated driving system, in particular its processor unit, always has enough calculation power for a reliable automated driving control.

The processor unit of the automated driving control may comprise one or several processors. It may for example constitute the electronic control unit (ECU) of the vehicle. It may also comprise the control device according to the present disclosure. For example, the control device may form a physical module of the processor unit or a software implemented module running on the processor unit.

The necessary calculation power for calibration may be provided by the processor unit, either for a predetermined amount or completely.

In other words, the control device may merely trigger the calibration which is then processed in part or completely by the processing unit. "calibrate the automated driving system and/or the sensor" may therefore also mean "trigger calibration of the automated driving system and/or the sensor" or "allow calibration of the automated driving system and/or the sensor". The processing unit desirably controls automated driving at the same time.

Either the automated driving system in general may be calibrated, e.g. by software calibration, or one or several of its sensors may be calibrated, e.g. by software and/or hardware calibration.

The control device may be further configured to control the automated driving system such that the processing load of the processor unit for automated driving control is reduced without stopping automated driving, when it is determined that calibration of the automated driving system and/or the sensor is necessary and the determined processing load exceeds the predetermined load threshold.

Accordingly, the proposed calibration technique can make sure that there is always enough calculation power for a reliable automated driving control, without stopping automated driving.

The processing load of the processor unit may be reduced by at least one of: reducing the vehicle speed, prohibiting vehicle acceleration, prohibiting a lane change of the vehicle, and keeping the vehicle in the centre of the driven lane.

The control device may be further configured to, when the processing load of the processor unit is reduced such that it falls under the predetermined load threshold, calibrate the automated driving system and/or the sensor.

The control device may be further configured to: calibrate the automated driving system and/or the sensor based on the received sensor information.

Alternatively or additionally, the control device may be further configured to: detect at least one predetermined static lane object, based on the received sensor information and calibrate the automated driving system and/or the sensor based on the detected predetermined static lane object. For example, the static lane object may comprise a lane marker, e.g. a dashed line or another periodic object, or a continuous line.

For example, the automated driving system may have a plurality of cameras. In such a case, when the plurality of cameras is used to generate a common image, there is the risk that the individual camera images are misaligned and have to be re-calibrated. In this case calibration may be done by comparing and re-align the individual images, e.g. by a physical calibration of the camera orientations and/or by a software calibration to align the individual images.

In another example, the control device may be configured to determine whether the sensor information comprises data representing the sensed vehicle body. In such a case it may be determined that a physical calibration of said camera becomes necessary, such that the sensed area representing the vehicle environment (e.g. of the lane objects) is maximized and/or sensed area representing the vehicle body is minimized.

The control device may be further configured to: determine the quality of the received sensor information by using a respectively trained neural network.

Alternatively or additionally, the control device may be further configured to: detect the predetermined static lane object based on the received sensor information by using a respectively trained neural network.

The control device may be further configured to: calibrate the automated driving system and/or the sensor only, in case the quality of the received sensor information exceeds a predetermined sensor quality condition, and/or in case a calibration quality of the detected predetermined static lane object exceeds a predetermined calibration quality condition.

In other words, a calibration is allowed only if the vehicle drives in environment suitable for calibration. Accordingly, the calibration can achieve a relatively precise and accurate quality with a reduced calculation time and/or effort.

The calibration quality of the detected predetermined static lane object may comprise at least one of the qualities of the sensor information representing the detected object, a spatial extent of the detected predetermined static lane object and a minimum number of detected predetermined static lane objects.

The predetermined calibration condition may require a minimum spatial extent of the detected predetermined static lane object and/or a minimum number of detected predetermined static lane objects.

The control device may be further configured to: control the automated driving system such that the calibration quality of the detected predetermined static lane object is increased without stopping automated driving, when it is determined that calibration of the automated driving system and/or the sensor is necessary and the calibration quality of the detected predetermined static lane objects is below the predetermined calibration quality condition.

In other words, the behaviour of the automated driving control may be changed such that the conditions for a calibration are ameliorated, before calibration is started.

The calibration quality of the detected predetermined static lane objects may be increased by at least one of: a lane change of the vehicle to a lane where at least one of the left and right lane markers comprises a continuous line, and controlling the vehicle speed such that the distance to a front vehicle exceeds a predetermined distance threshold.

The control device may be further configured to, when the calibration quality of the detected predetermined static lane objects is increased such that it exceeds the predetermined calibration quality condition, calibrate the automated driving system and/or the sensor.

The present disclosure further relates to an automated driving system for a vehicle comprising:

at least one sensor configured to sense the environment of the vehicle and generate respective sensor information, a processor unit configured to control automated driving of the vehicle based on the sensor information, and a control device as described above.

The present disclosure further relates to a vehicle comprising an automated driving system as described above.

Finally, the present disclosure further relates to a (computer implemented) method for (e.g. automatically) calibrating an automated driving system of a vehicle during driving, the method comprising the steps of:

receiving sensor information of at least one sensor of the automated driving system, the sensor being configured to sense the environment of the vehicle, determining based on the received sensor information, whether calibration of the automated driving system and/or the sensor is necessary, determining the processing load of a processor unit of the automated driving system, the processor unit controlling automated driving of the vehicle, and calibrating the automated driving system and/or the sensor only, in case the determined processing load is below a predetermined load threshold.

The method may comprise further method steps which correspond to the functions of the control device or the automated driving system, as described above.

It is intended that combinations of the above-described elements and those within the specification may be made, except where otherwise contradictory.

It is to be understood that both the foregoing general description and the following detailed description are exemplary and explanatory only and are not restrictive of the disclosure, as claimed.

The accompanying drawings, which are incorporated in and constitute a part of this specification, illustrate embodiments of the disclosure and together with the description, and serve to explain the principles thereof.

DESCRIPTION OF THE EMBODIMENTS

Reference will now be made in detail to exemplary embodiments of the disclosure, examples of which are illustrated in the accompanying drawings. Wherever possible, the same reference numbers will be used throughout the drawings to refer to the same or like parts.

Figure 1:
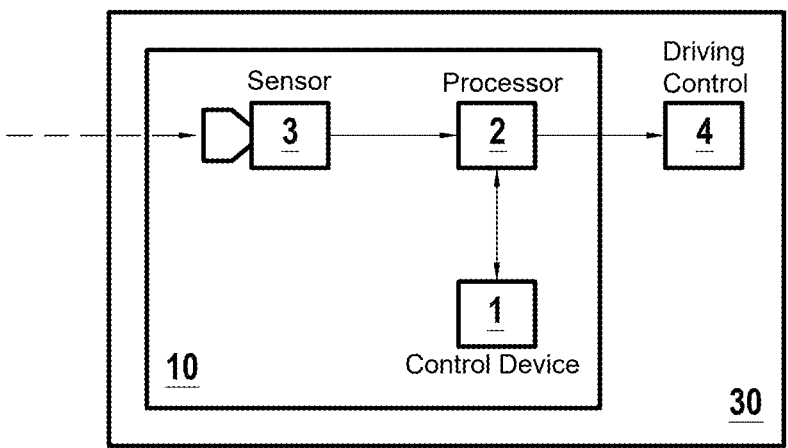
FIG. 1 shows a block diagram of a control device for calibrating an automated driving system according to embodiments of the present disclosure.

FIG. 1 shows a block diagram of a control device 1 for calibrating an automated driving system 10 according to embodiments of the present disclosure. The system 10 may be comprised by a vehicle 30, in particular control driving of the vehicle.

The automated driving system comprises a processor unit 2 and at least one sensor 3. The processor unit 2 controls driving of the vehicle in response to received sensor information. In particular, the processor unit may control any elements 4 of the vehicle which are relevant for driving control, e.g. a power train or a steering mechanism of the vehicle. The automated driving system may further comprise the control device 1, more in particular, the control device 1 may form a part of the processor unit 2. Alternatively, the control device 1 may be an element which is external to the automated driving system 10 and/or the vehicle 30.

The control device 1 and/or the processor unit 2 may additionally carry out further functions in the vehicle 30. For example, the control device and/or the processor unit may also act as the general purpose ECU (electronic control unit) of the vehicle. The control device 1 and/or the processor unit 2 may comprise an electronic circuit, a processor (shared, dedicated, or group), a combinational logic circuit, a memory that executes one or more software programs, and/or other suitable components that provide the described functionality.

The system 10 may be connected in a wireless manner to an external information source (not shown). Said external information source may comprise a satellite navigation system and/or a map system. Accordingly, the system 10 may receive external position information and/or map data from the information source.

The control device 1 is further connected (e.g. via the processor unit 2) to at least one sensor 3, in particular an optical sensor, e.g. a digital camera. The digital camera 3 is configured such that it can sense a driving scene, i.e. in particular the road on which the vehicle is driving. The digital camera is desirably oriented toward the principle driving direction of the vehicle, i.e. such that it senses the lane on which the vehicle is driving including the left and right periphery of the lane. It is also possible to use several cameras 3. Accordingly, it may also be reasonable to use several sensors (e.g. cameras), in order to sense the complete surrounding of the vehicle, including sensing the left and right sides of the vehicle and/or the back of the vehicle.

The output of the digital camera 3, in particular single images recorded at a predetermined sampling frequency (e.g. 10 Hz), is transmitted to the processor unit 2 and/or the control device 1. Desirably, the output is transmitted instantaneously, i.e. in real time or in quasi real time. Hence, a static lane object may also be detected by the control device in real time or in quasi real time.

For example the control device may receive the complete sensor information without any filtering by the processor unit 2. Alternatively the control device may receive only that part of the sensor information which is necessary to determine, whether calibration is necessary and optionally further sensor information which is necessary for calibration and/or for determining the quality of the sensor information, i.e. its suitability for calibration. Furthermore the control device may receive information regarding the processing load of the processor unit 2.

In response to these inputs, the control device may determine whether calibration is necessary and further, whether calibration is possible due to the current processing load of the processor unit 2. The control device may optionally further determine whether the current sensor information is suitable for calibration. Based on the determination results the control device may instruct the processor unit to carry out calibration or alternatively may do the calibration on its own and output the calibration results to the processing device.

For example, when the plurality of cameras is used to generate a common image, there is the risk that the individual camera images are misaligned and have to be re-calibrated. In this case calibration may be done by comparing and re-align the individual images, e.g. by a physical calibration of the camera orientations and/or by a software calibration to align the individual images.

The control device , may further control the processing device such that the processing load of the processor unit 2 for automated driving control is reduced and/or such that the that the calibration quality of the detected predetermined static lane object is increased.

Figure 2:
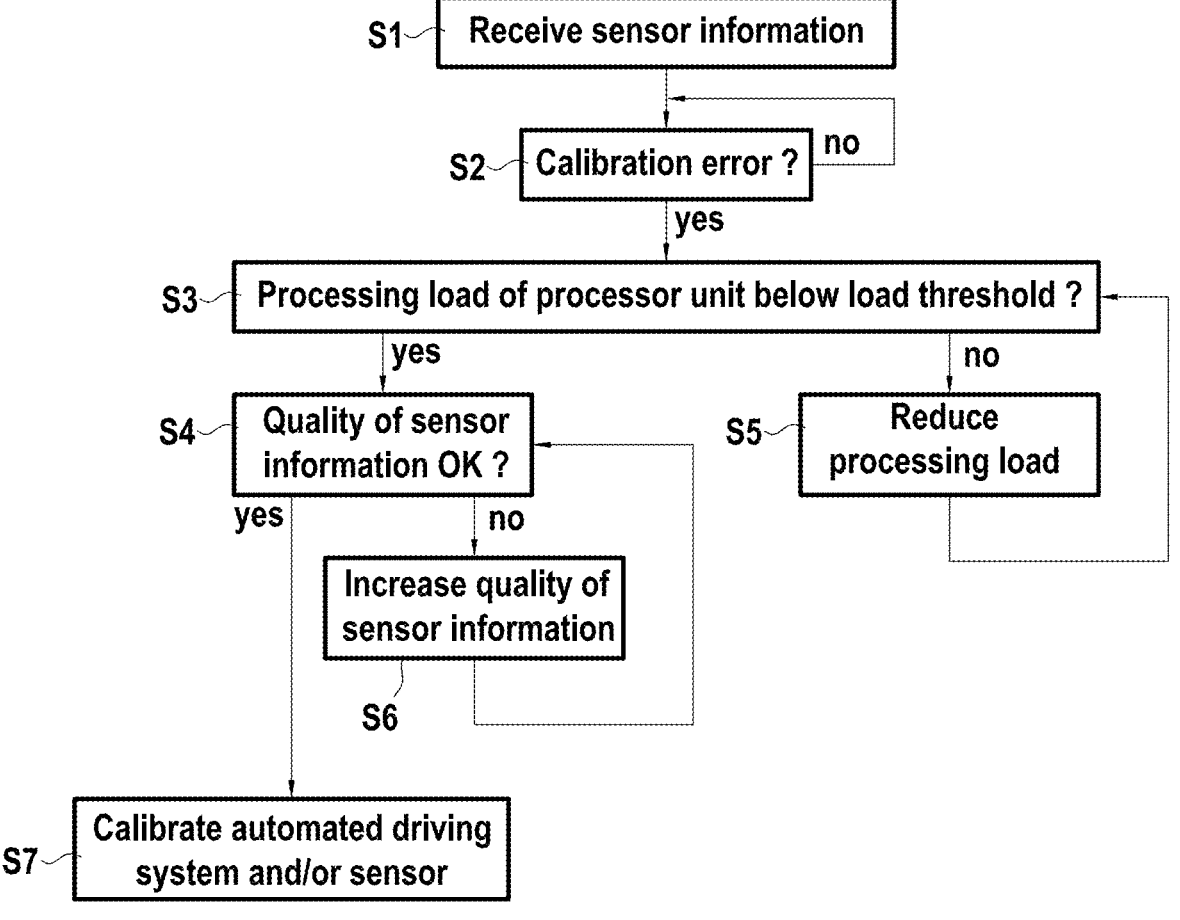
FIG. 2 shows a schematic flow chart illustrating an exemplary method of calibrating an automated driving system of a vehicle according to embodiments of the present disclosure.

FIG. 2 shows a schematic flow chart illustrating an exemplary method of calibrating an automated driving system of a vehicle according to embodiments of the present disclosure. The system 10 and/or the control device 1 (e.g. together with the processor unit 2) is desirably configured to carry out said method.

In step S1 sensor information is received by the system 10, in particular the control device 1. This step may include receiving information regarding static lane objects or determining static lane objects based on the sensor information. The static lane object may comprise for example a lane marker, e.g. a dashed line and/or a continuous line marking the lane and/or or another periodic object being periodically positioned on at least one side of the lane or road.

In step S2 it is determined whether a calibration of the automated driving system and/or its at least one sensor becomes necessary. For example, in case the sensor information shows the vehicle body, it may be determined that a physical calibration of said camera becomes necessary, such that the sensed area representing the vehicle environment is maximized and/or sensed area representing the vehicle body is minimized.

Step S2 is desirably repeatedly carried out, for every nth image received from the sensor (e.g. n=any of 100 to 1000). Desirably steps S3 to S7 are only triggered, in case a calibration error is determined in step S2.

In step S3 it is determined whether the processing load is below a predetermined load threshold. In other words, it is determined whether there is sufficient calculation power of the processor unit 2 for calibration.

In case the result of the determination in step S3 is negative, one option is to control the automated driving system such that the processing load of the processor unit for automated driving control is reduced without stopping automated driving. For example, the vehicle speed may be reduced, and/or vehicle acceleration and/or a lane change of the vehicle may be prohibited, and/or the vehicle may be kept in the center of the driven lane. Subsequently the determination of step S3 is repeated. Another option is that the determination of step S3 is done repeatedly without any active control like it is done in step S5.

Once it is determined in step S2 that the processing load is below the predetermined load threshold, it is continued with step S4 or step S7.

In (optional) step S4 it is determined whether the quality of the sensor information is suitable for sensor calibration. In particular, it may be determined whether the calibration quality of any detected predetermined static lane objects exceeds a predetermined calibration quality condition. The calibration quality of the detected predetermined static lane object may comprise at least one of the qualities of the sensor information representing the detected object, a spatial extent of the detected predetermined static lane object and a minimum number of detected predetermined static lane objects.

The predetermined calibration condition may require a minimum spatial extent of the detected predetermined static lane object and/or a minimum number of detected predetermined static lane objects. In another or a further example the quality of the sensor information may concern the quality of the sensor signal, e.g. whether a camera sensor is covered with rain droplets.

In case the result of the determination in step S4 is negative, one option is to control the automated driving system in step S6 such that the received sensor information becomes more suitable for calibration. In particular, the automated driving system may be controlled such that the calibration quality of the detected predetermined static lane object is increased without stopping automated driving. For example, it may be triggered a lane change of the vehicle to a lane where at least one of the left and right lane markers comprises a continuous line, and/or the vehicle speed may be controlled such that the distance to a front vehicle exceeds a predetermined distance threshold. Subsequently the determination of step S4 is repeated. Another option is that the determination of step S4 is done repeatedly without any active control like it is done in step S6.

Once it is determined in step S4 that the processing load is below the predetermined load threshold, it is continued with step S7.

In step S7 the automated driving system and/or the sensor are calibrated. For example, the orientation of the sensor, e.g. a camera, may be physically calibrated, e.g. such that the area of visible lane objects is maximized and of the visible vehicle is minimized.

Throughout the description, including the claims, the term "comprising a" should be understood as being synonymous with "comprising at least one" unless otherwise stated. In addition, any range set forth in the description, including the claims should be understood as including its end value(s) unless otherwise stated. Specific values for described elements should be understood to be within accepted manufacturing or industry tolerances known to one of skill in the art, and any use of the terms "substantially" and/or "approximately" and/or "generally" should be understood to mean falling within such accepted tolerances.

Although the present disclosure herein has been described with reference to particular embodiments, it is to be understood that these embodiments are merely illustrative of the principles and applications of the present disclosure.

It is intended that the specification and examples be considered as exemplary only, with a true scope of the disclosure being indicated by the following claims.

The invention claimed is:

1. A control device for calibrating an automated driving system of a vehicle during driving, configured to:

receive sensor information of at least one sensor of the automated driving system, the at least one sensor being configured to sense the environment of the vehicle, determine based on the received sensor information, whether calibration of the automated driving system and/or the at least one sensor is necessary, determine the processing load of a processor unit of the automated driving system, the processor unit controlling automated driving of the vehicle, calibrate the automated driving system and/or the at least one sensor only, in case the determined processing load is below a predetermined load threshold; and control the automated driving system such that the processing load of the processor unit for automated driving control is reduced without stopping automated driving, when it is determined that calibration of the automated driving system and/or the sensor is necessary and the determined processing load exceeds the predetermined load threshold.

2. An automated driving system for a vehicle comprising:

at least one sensor configured to sense the environment of the vehicle and generate respective sensor information,

a processor unit configured to control automated driving of the vehicle based on the sensor information, and a control device according to claim 1.

3. A vehicle comprising an automated driving system (10) according claim 2.

4. The control device according to claim 1, further configured to, when the processing load of the processor unit is reduced such that it falls under the predetermined load threshold, calibrate the automated driving system and/or the at least one sensor.

5. The control device according to claim 1, further configured to:

calibrate the automated driving system and/or the sensor based on the received sensor information, and/or detect at least one predetermined static lane object, based on the received sensor information and calibrate the automated driving system and/or the sensor based on the detected predetermined static lane object, wherein the static lane object comprises in particular a lane marker, the lane marker comprising a dashed line, another periodic object, or a continuous line.

6. The control device according to claim 5, further configured to:

determine a quality of the received sensor information and/or detect the predetermined static lane object based on the received sensor information by using a respectively trained neural network.

7. The control device according to any one of claim 6, further configured to, when a calibration quality of the detected predetermined static lane objects is increased such that it exceeds the predetermined calibration quality condition, calibrate the automated driving system and/or the sensor.

8. The control device according to the preceding claim 5, further configured to:

calibrate the automated driving system and/or the sensor only, in case the quality of the received sensor information exceeds a predetermined sensor quality condition, and/or in case a calibration quality of the detected predetermined static lane object exceeds a predetermined calibration quality condition.

9. The control device according to claim 8, further configured to:

control the automated driving system such that the calibration quality of the detected predetermined static lane object is increased without stopping automated driving, when it is determined that calibration of the automated driving system and/or the sensor is necessary and the calibration quality of the detected predetermined static lane objects is below the predetermined calibration quality condition.

10. The control device according to claim 9, wherein the calibration quality of the detected predetermined static lane objects is increased by at least one of:

a lane change of the vehicle to a lane where at least one of the left and right lane markers comprises a continuous line, controlling the vehicle speed such that the distance to a front vehicle exceeds a predetermined distance threshold.

11. The control device according to claim 8, wherein the calibration quality of the detected predetermined static lane object comprises at least one of the quality of the sensor information representing the detected object, a spatial extent of the detected predetermined static lane object and a minimum number of detected predetermined static lane objects, and/or

the predetermined calibration condition requires at least one of a predetermined minimum quality of the sensor information representing the detected object, a predetermined minimum spatial extent of the detected predetermined static lane object in the sensed vehicle environment, and a predetermined minimum number of detected predetermined static lane objects.

12. The control device according to claim 1, wherein the processing load of the processor unit is reduced by at least one of:

reducing the vehicle speed, prohibiting vehicle acceleration, prohibiting a lane change of the vehicle, and keeping the vehicle in the center of the driven lane.

13. A control device for calibrating an automated driving system of a vehicle during driving, configured to:

receive sensor information of at least one sensor of the automated driving system, the at least one sensor being configured to sense the environment of the vehicle, determine based on the received sensor information, whether calibration of the automated driving system and/or the at least one sensor is necessary, determine the processing load of a processor unit of the automated driving system, the processor unit controlling automated driving of the vehicle, calibrate the automated driving system and/or the at least one sensor only, in case the determined processing load is below a predetermined load threshold, determine a quality of the received sensor information and/or detect the predetermined static lane object based on the received sensor information by using a respectively trained neural network, and when a calibration quality of the detected predetermined static lane objects is increased such that it exceeds the predetermined calibration quality condition, calibrate the automated driving system and/or the sensor.

14. A method for calibrating an automated driving system of a vehicle during driving, the method comprising the steps of:

receiving sensor information of at least one sensor of the automated driving system, the at least one sensor being configured to sense the environment of the vehicle, determining based on the received sensor information, whether calibration of the automated driving system and/or the at least one sensor is necessary, determining the processing load of a processor unit of the automated driving system, the processor unit controlling automated driving of the vehicle, calibrating the automated driving system and/or the at least one sensor only, in case the determined processing load is below a predetermined load threshold; and controlling the automated driving system such that the processing load of the processor unit for automated driving control is reduced without stopping automated driving, when it is determined that calibration of the automated driving system and/or the sensor is necessary and the determined processing load exceeds the predetermined load threshold.

15. A control device for calibrating an automated driving system of a vehicle during driving, configured to:

receive sensor information of at least one sensor of the automated driving system, the at least one sensor being configured to sense the environment of the vehicle, determine based on the received sensor information, whether calibration of the automated driving system and/or the at least one sensor is necessary, determine the processing load of a processor unit of the automated driving system, the processor unit controlling automated driving of the vehicle, calibrate the automated driving system and/or the at least one sensor only, in case the determined processing load is below a predetermined load threshold, calibrate the automated driving system and/or the sensor based on the received sensor information, and/or detect at least one predetermined static lane object, based on the received sensor information and calibrate the automated driving system and/or the sensor based on the detected predetermined static lane object, calibrate the automated driving system and/or the sensor only, in case the quality of the received sensor information exceeds a predetermined sensor quality condition, and/or in case a calibration quality of the detected predetermined static lane object exceeds a predetermined calibration quality condition, and control the automated driving system such that the calibration quality of the detected predetermined static lane object is increased without stopping automated driving, when it is determined that calibration of the automated driving system and/or the sensor is necessary and the calibration quality of the detected predetermined static lane objects is below the predetermined calibration quality condition, wherein the static lane object comprises in particular a lane marker, the lane marker comprising a dashed line, another periodic object, or a continuous line.

16. The control device according to claim 15, wherein the calibration quality of the detected predetermined static lane objects is increased by at least one of:

a lane change of the vehicle to a lane where at least one of the left and right lane markers comprises a continuous line, controlling the vehicle speed such that the distance to a front vehicle exceeds a predetermined distance threshold.

\* \* \* \* \*